US012505199B2

(12) United States Patent
Gehtman et al.

(10) Patent No.: US 12,505,199 B2
(45) Date of Patent: Dec. 23, 2025

(54) DEVICE PROTECTION USING PRE-EXECUTION MULTI-FACTOR PROCESS AUTHENTICATION

(71) Applicant: Dell Products L.P., Round Rock, TX (US)

(72) Inventors: Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 270 days.

(21) Appl. No.: 18/081,759

(22) Filed: Dec. 15, 2022

(65) Prior Publication Data

US 2024/0202308 A1    Jun. 20, 2024

(51) Int. Cl.
*G06F 21/44* (2013.01)
(52) U.S. Cl.
CPC .................................. *G06F 21/445* (2013.01)
(58) Field of Classification Search
None
See application file for complete search history.

(56) References Cited

U.S. PATENT DOCUMENTS

| 10,979,430 | B1 * | 4/2021 | Hitchcock | H04L 63/102 |
| 2015/0188944 | A1 * | 7/2015 | Dyer | H04L 63/1416 726/3 |
| 2020/0242222 | A1 * | 7/2020 | Machani | G06F 21/45 |
| 2021/0334085 | A1 * | 10/2021 | Vessels | H04W 12/35 |

FOREIGN PATENT DOCUMENTS

WO    WO-2013025581 A1 *    2/2013    ............ G06F 21/31

OTHER PUBLICATIONS

Shacklett, et al.; "Definition Authentication"; downloaded on Dec. 13, 2022.
Almohri, Hussain M.J.; "Process Authentication for High System Assurance"; IEEE Transactions on Dependable and Secure Computing, vol. 11, No. 2, Mar./Apr. 2014.

* cited by examiner

*Primary Examiner* — William J. Goodchild
(74) *Attorney, Agent, or Firm* — Ryan, Mason & Lewis, LLP

(57) ABSTRACT

Techniques are provided for device protection using pre-execution multi-factor authentication of a process. One method comprises obtaining, by a software entity associated with an operating system kernel of a processing device, a request to execute a process on the processing device; performing, by the software entity, a first authentication of the process that evaluates a first set of information of the process; performing, by the software entity, a second authentication of the process to obtain a verification result, wherein the second authentication of the process evaluates a second set of different information of the process; and allowing the process to execute on the processing device based at least in part on the verification result. The second set of different information may comprise a name of the process, an identifier of the process and/or an identifier of a given processing device that will execute the process.

20 Claims, 8 Drawing Sheets

DEVICE PROTECTION USING PRE-EXECUTION MULTI-FACTOR PROCESS AUTHENTICATION

FIELD

The field relates generally to information processing systems, and more particularly to the protection of such information processing systems.

BACKGROUND

Computing devices are typically configured to incorporate security functionality to protect such devices from malicious activity. For example, it may be desirable to prevent suspicious computer processes unless they are legitimate and authorized. Role-based access control (RBAC) techniques may be employed to restrict access to devices or network resources based on the roles of individual users within an organization. RBAC techniques typically allow users to access only the information and other resources needed for their jobs and prevent users from accessing additional resources. RBAC techniques, however, are vulnerable to various types of attacks, such as password theft and/or session hijacking.

A need exists for improved techniques for protecting devices from suspicious and/or unauthorized computer processes.

SUMMARY

In one embodiment, a method comprises obtaining, by at least one software entity associated with an operating system kernel of at least one processing device, a request to execute a process on the at least one processing device; performing, by the at least one software entity associated with the operating system kernel, a first authentication of the process that evaluates a first set of information of the process; performing, by the at least one software entity associated with the operating system kernel, a second authentication of the process to obtain a verification result, wherein the second authentication of the process evaluates a second set of different information of the process; and allowing the process to execute on the at least one processing device based at least in part on the verification result.

In some embodiments, the second set of different information of the process comprises one or more of: a name of the process, an identifier of the process and an identifier of a given one of the at least one processing device that will execute the process. The identifier of the process may uniquely identify the process and may be assigned to the process, for example, in connection with an installation of the process on the at least one processing device. The identifier of the process may be stored in a trusted platform module of the at least one processing device.

In one or more embodiments, the second authentication of the process may be performed by a multi-factor authentication module associated with the at least one processing device.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for device protection using pre-execution multi-factor authentication of a process (sometimes referred to herein as process authentication).

In one or more embodiments, the disclosed pre-execution process interception techniques allow a user to submit a request to execute a process by a device. In at least some embodiments, the process is intercepted by a software entity associated with an operating system kernel of the device, prior to an execution of the process, and the process is only executed following a multi-factor authentication of the process.

Among other benefits, the disclosed techniques for device protection using pre-execution multi-factor process authentication protect devices (and/or the data associated with such devices) from unauthorized processes and/or unauthorized operations performed by such processes, such as attempts by the process to: (i) perform an unauthorized encryption or deletion of one or more files; (ii) execute sensitive commands (or other designated commands) that may impair the operation of the device or the data of the device and/or (iii) suspend operation of a device. In addition, the pre-execution process interception and authentication allows the permission requirements associated with a given process and/or the metadata associated with the given process to be evaluated in real-time prior to the process execution. In this manner, the latest applicable rules and/or guidelines (collectively referred to herein as policies) for process execution can be evaluated before the process is executed.

Figure 1:
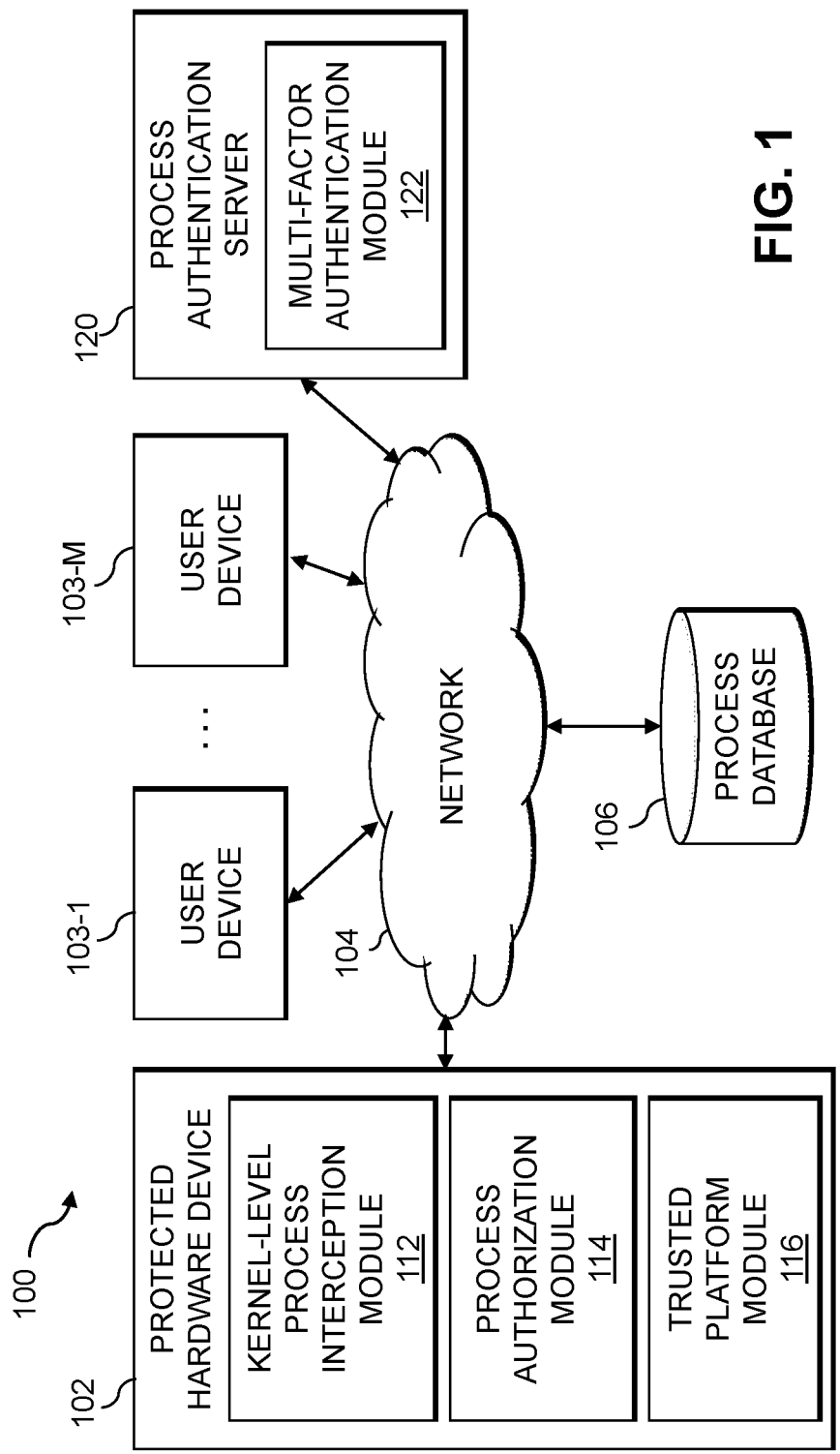
FIG. 1 illustrates an information processing system configured to protect devices using pre-execution multi-factor authentication of a process in accordance with an illustrative embodiment.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more protected hardware devices 102, one or more process authentication servers 120 and one or more process databases 106, discussed below.

The protected hardware devices 102 may comprise edge devices, host devices and other devices that execute processes. One or more aspects of the disclosure recognize that edge devices, for example, are attractive targets for an attack and often comprise critical infrastructure that may require a pre-execution evaluation of whether to execute certain processes and/or operations. Edge devices may be stored, for example, in a physical location that may not be properly secured. An attacker may be able to access a perimeter of a location of the edge device (or another adjacent or nearby location that is within range of the edge device).

The user devices 103 may comprise, for example, host devices and/or devices such as mobile telephones, laptop computers, tablet computers, desktop computers or other types of computing devices. Such devices are examples of what are more generally referred to herein as "processing devices" which may be protected using the disclosed device protection techniques. Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary protected hardware device 102 may comprise a kernel-level process interception module 112, a process authorization module 114 and a trusted platform module 116. In some embodiments, the kernel-level process interception module 112 automatically detects a user attempt to execute a process, as discussed further below in conjunction with FIGS. 3 through 5, for example. The process authorization module 114 automatically requests a multi-factor authentication of a process, as discussed further below in conjunction with FIGS. 3 through 5, before the process is executed by the respective device. In addition, the process authorization module 114 may request that a multi-factor authentication module 122, discussed further below, for example, of the process authentication server 120 perform a multi-factor authentication of the process before a given intercepted process can be executed.

In one or more embodiments, the trusted platform module 116 is used to store various process metadata associated with one or more processes, such as a process identifier (PID), a process name (sometimes referred to as a service name), and an identifier of a motherboard or another processor upon which a given process is expected to execute.

It is to be appreciated that this particular arrangement of modules 112, 114, 116 illustrated in the protected hardware device 102 of the FIG. 1 embodiment is presented by way of example only, and alternative arrangements can be used in other embodiments. For example, the functionality associated with modules 112, 114, 116 in other embodiments can be combined into a single element, or separated across a larger number of elements. As another example, multiple distinct processors can be used to implement different ones of modules 112 and 114 or portions thereof.

At least portions of modules 112, 114, 116 may be implemented at least in part in the form of software that is stored in memory and executed by a processor. An exemplary process utilizing modules 112, 114, 116 of the protected hardware device 102 in computer network 100 will be described in more detail with reference to FIGS. 3 through 5.

Other protected hardware devices 102 (not shown in FIG. 1) are assumed to be configured in a manner similar to that shown for protected hardware device 102 in the figure.

The process authentication server 120 may be implemented, for example, on the cloud, such as a private cloud, or on the premises of an enterprise or another entity, as discussed further below in conjunction with FIG. 3. In some embodiments, the process authentication server 120, or portions thereof, may be implemented as part of a host device. As also depicted in FIG. 1, the process authentication server 120 further comprises a multi-factor authentication module 122. In some embodiments, the multi-factor authentication module 122 processes requests from, for example, the process authorization module 114 of one or more protected hardware devices 102 to perform a multi-factor authentication of one or more processes that are intercepted prior to execution. In other embodiments, one or more of the protected hardware devices 102 may include the multi-factor authentication module 122 instead of, or in addition, to the process authentication server 120.

It is to be appreciated that this particular arrangement of the multi-factor authentication module 122 illustrated in the process authentication server 120 of the FIG. 1 embodiment is presented by way of example only, and alternative arrangements can be used in other embodiments. For example, the functionality associated with multi-factor authentication module 122 in other embodiments can include additional modules, or be separated across a larger number of modules. As another example, multiple distinct processors can be used to implement different portions of multi-factor authentication module 122.

At least portions of multi-factor authentication module 122 may be implemented at least in part in the form of software that is stored in memory and executed by a processor. An exemplary process utilizing multi-factor authentication module 122 of an example process authentication server 120 in computer network 100 will be described in more detail with reference to the flow diagrams of, for example, FIGS. 3 through 5.

Additionally, the protected hardware device 102 and/or the process authentication server 120 can have an associated process database 106 configured to store, for example, a set of process authentication policies, process-specific authentication requirements and/or information related to various devices, such as one or more protected hardware devices 102, such as device locations, network address assignments and performance data. The process authentication policies may specify, for example, various authentication requirements, guidelines, procedures and/or tasks for the evaluation of one or more processes, process types and/or processes satisfying other process authentication criteria. The process database 106 may be maintained, for example, by the process authentication server 120.

At least portions of the process database 106 configured to store the process authentication policies may be implemented, for example, using a vault or another protected storage provided by an operating system of one or more of the protected hardware devices 102, user devices 103 and/or process authentication servers 120. In some embodiments, any changes to data stored in the protected storage requires a designated level of approval.

In some embodiments, the processes requiring authentication may comprise sensitive processes or other processes comprising operations of a designated operation type. Such sensitive processes may be identified, for example, by evaluating one or more of: one or more sensitive processes identified, for example, in the process database 106; one or more sensitive process properties identified, for example, in the process database 106 and one or more sensitive process criteria identified, for example, in the process database 106.

In one or more embodiments, one or more sensitive processes may have an associated automated evaluation process identified, for example, in process database 106, that may be implemented in response to a request to evaluate whether a particular process should be allowed to execute.

Such sensitive processes may comprise, for example, processes that perform one or more of the following operations: a user add operation to create one or more users; an operation to change a password for one or more user accounts; a change mode operation that changes an access mode of a file; a super user operation that allows a permitted user, sometimes referred to as a super user, to execute an operation on behalf of another user, as specified, for example, by a security policy; a super user operation used to run a function as a different user; a yum operation that allows users and system administrators to install, update, remove and/or search software packages on a system; an apt operation for installing, updating, removing, and/or otherwise managing deb packages on Ubuntu, Debian, and related Linux distributions; a zipper operation to specify a compression level; a user modification operation to modify one or more existing user account details, such as a username, a password, a home directory location, and/or a default shell; a system control operation for examining and controlling, for example, the service manager; and/or a system operation to pass processes to the operating system.

The process database 106 in the present embodiment is implemented using one or more storage systems associated with the process authentication server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more protected hardware devices 102, user devices 103 and/or process authentication servers 120 may be implemented on a common processing platform, or on separate processing platforms. The one or more protected hardware devices 102 and user devices 103 may be configured to interact over the network 104 in at least some embodiments with the process authentication server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more protected hardware devices 102, user devices 103 and/or process authentication servers 120 can be one or more input-output devices (not shown), which illustratively comprise keyboards, displays or other types of input-output devices in any combination. Such input-output devices can be used, for example, to support one or more user interfaces to the process authentication server 120, as well as to support communication between the process authentication server 120 and other related systems and devices not explicitly shown.

The one or more protected hardware devices 102, user devices 103 and/or process authentication servers 120 in the FIG. 1 embodiment are assumed to be implemented using at least one processing device. Each such processing device generally comprises at least one processor and an associated memory, and implements one or more functional modules for controlling certain features of the respective device.

More particularly, the one or more protected hardware devices 102, user devices 103 and/or process authentication servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more protected hardware devices 102, user devices 103 and/or process authentication servers 120 to communicate in some embodiments over the network 104 with each other (as well as one or more other networked devices), and illustratively comprises one or more conventional transceivers.

It is to be understood that the particular set of elements shown in FIG. 1 for device protection using pre-execution multi-factor process authentication is presented by way of illustrative example only, and in other embodiments additional or alternative elements may be used. Thus, another embodiment includes additional or alternative systems, devices and other network entities, as well as different arrangements of modules and other components.

Figure 2:
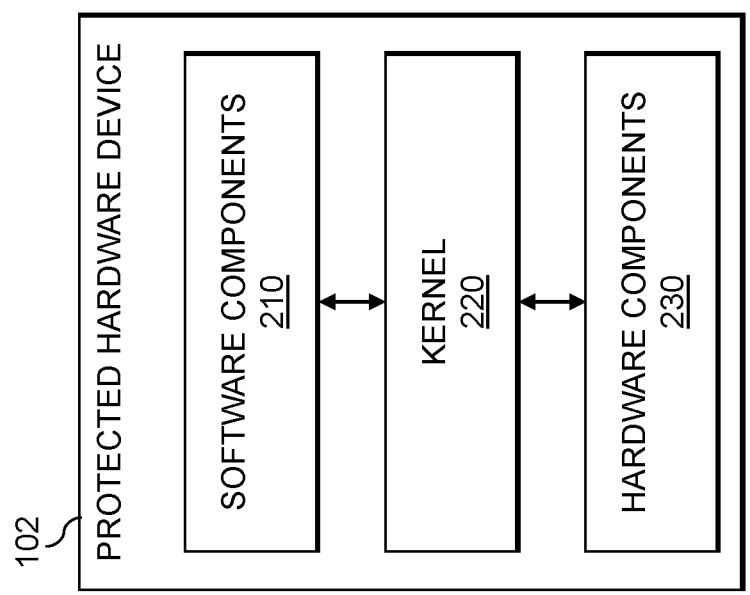
FIG. 2 illustrates the protected hardware device of FIG. 1 in further detail in accordance with an illustrative embodiment.

FIG. 2 illustrates a protected hardware device 102 in accordance with an illustrative embodiment. In the example of FIG. 2, the protected hardware device 102 comprises a kernel 220, resident in the memory of the protected hardware device 102, that provides an interface between software components 210 and hardware components 230.

As used herein, the term "kernel" shall be broadly construed to encompass any computer program that is part of an operating system of a protected hardware device 102 that enables interactions between such software components 210, such as applications, and the hardware components 230 of the protected hardware device 102. The hardware components 230 may comprise, for example, processing components, memory components, storage components and other hardware components.

In one or more embodiments, a software entity associated with the kernel 220 intercepts processes, prior to the execution of such intercepted processes by the operating system of the protected hardware device 102, so that a multi-factor authentication of the intercepted process may be performed. The kernel 220 may hold such intercepted processes during the evaluation, and only release such intercepted processes for execution upon a successful multi-factor authentication.

Figure 3:
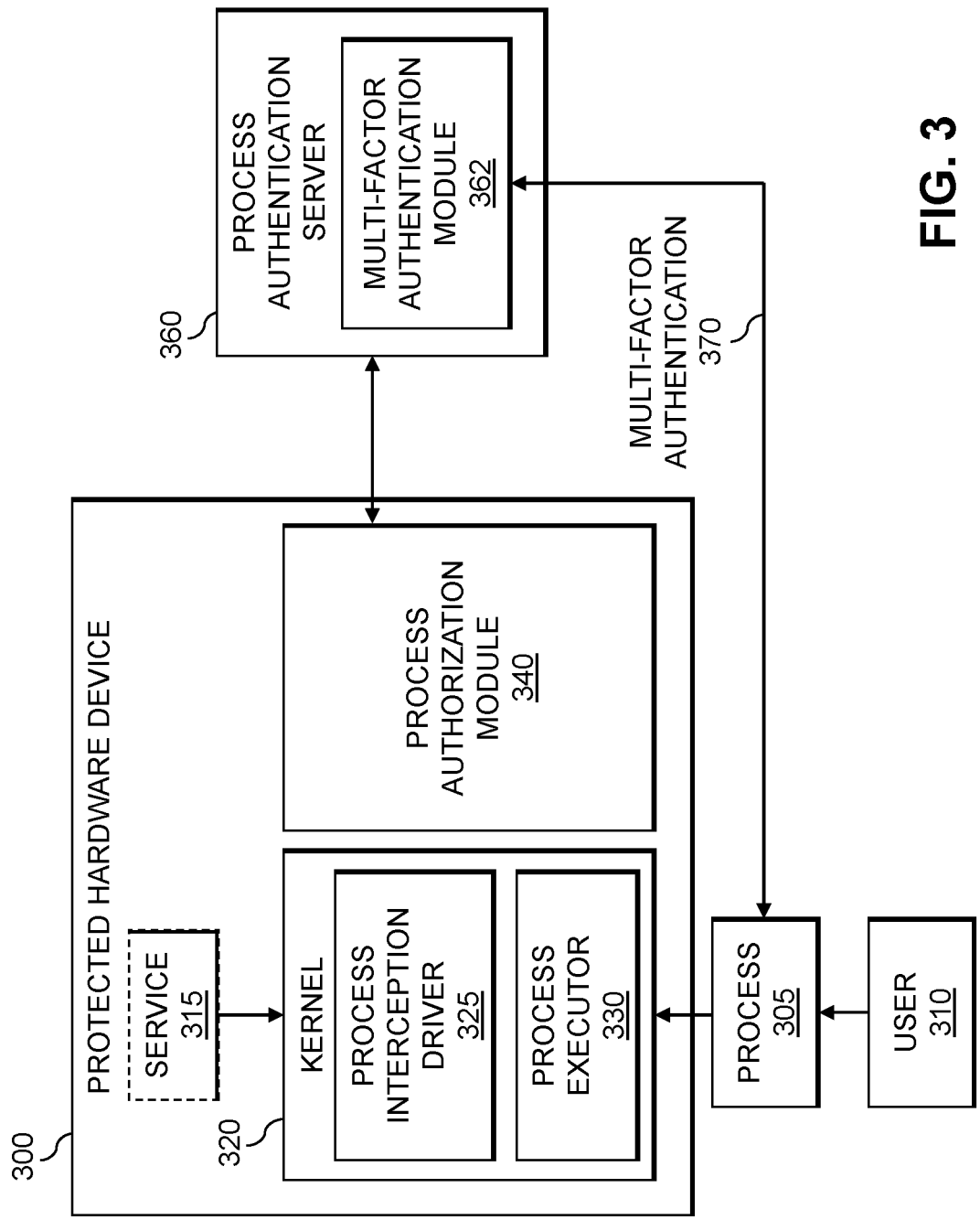
FIG. 3 illustrates an environment for device protection using pre-execution multi-factor authentication of a process in accordance with an illustrative embodiment.

FIG. 3 illustrates an environment for device protection using pre-execution multi-factor process authentication in accordance with an illustrative embodiment. In the example of FIG. 3, a user 310 (or a service 315) requests the protected hardware device 300 to execute a process 305. The submitted process 305 is intercepted by a process interception driver 325 of a kernel 320 of the protected hardware device 300, prior to an execution of the process 305. The process interception driver 325 determines if an evaluation of the requested process 305 is required before the submitted process 305 can be executed by a process executor 330. The process interception driver 325 may determine if the evaluation of the submitted process 305 is required, for example, by accessing and applying one or more policies from the specified process evaluation policies. The one or more policies may specify, for example, one or more specific processes, process types and/or other process criteria that require such evaluation (e.g., an authentication of such processes).

A process authorization module 340 may automatically request an authentication of the process 305 intercepted by the process interception driver 325, as discussed further below in conjunction with FIGS. 3 through 5, before the process 305 is executed by the process executor 330. The process authorization module 340 may identify any particular multi-factor authentication requirements for the intercepted process 305, for example, by accessing the process database 106 of FIG. 1 that identifies, for example, a set of process authentication policies and/or process-specific authentication requirements needed to evaluate and approve the execution of one or more specific processes, process types and/or processes satisfying other process approval criteria.

The process authorization module 340 may send the multi-factor authentication request to a multi-factor authentication module 362 of a process authentication server 360. The process authentication server 360 may be implemented, for example, on the cloud, such as on a private cloud, or on the premises of an enterprise or another entity. The multi-factor authentication module 362 performs a multi-factor authentication 370 of the process 305 and provides an authentication result to the process authorization module 340, as discussed further below.

Figure 4:
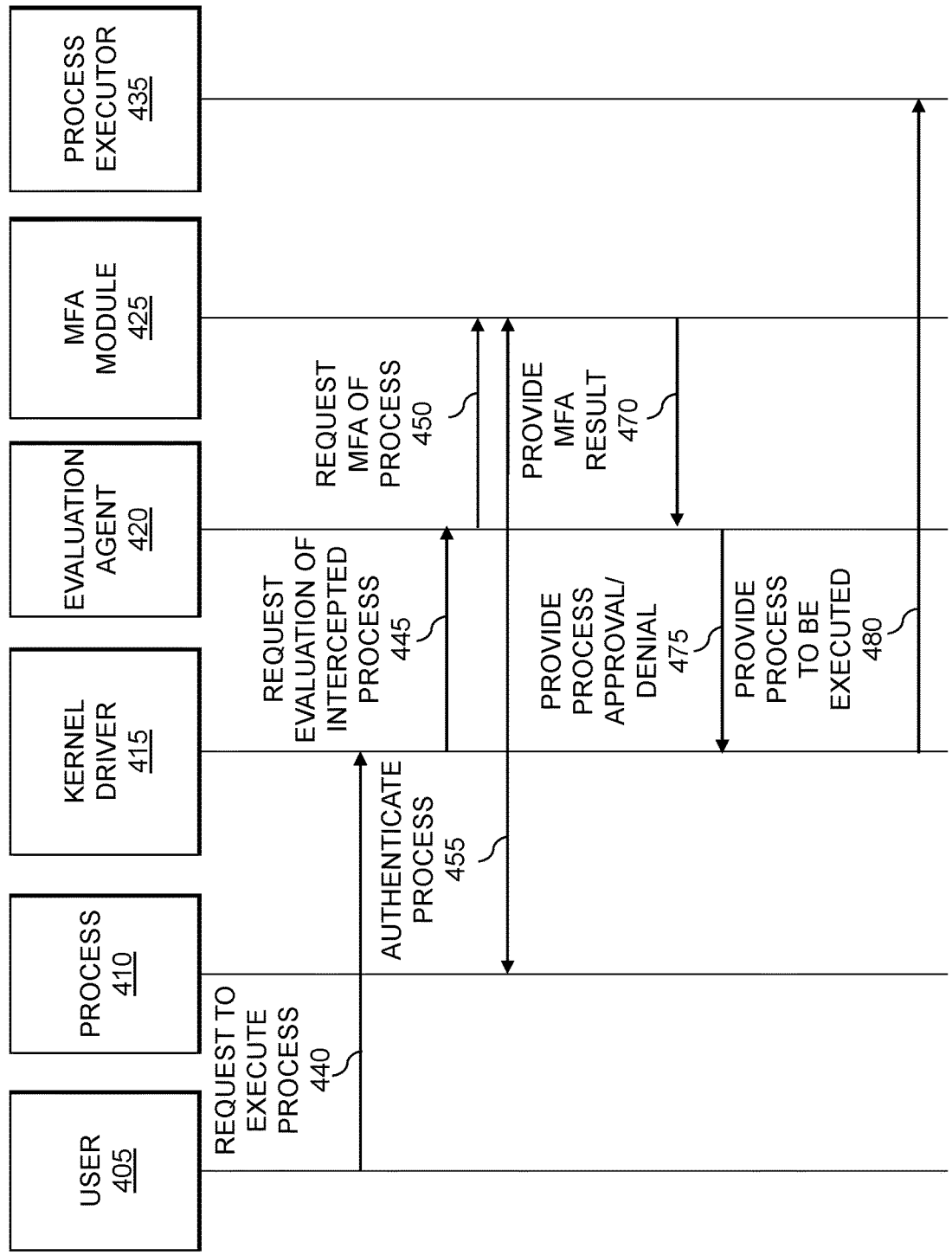
FIG. 4 is a communication diagram illustrating a process for device protection using pre-execution multi-factor authentication of a process, according to one or more embodiments.

FIG. 4 is a communication diagram illustrating an exemplary process for device protection using pre-execution multi-factor process authentication, according to one or more embodiments. In the example of FIG. 4, a user 405 generates a request 440 (e.g., an attempt) to initiate a process 410 on a device. A kernel driver 415 of the device intercepts the request to execute the process, and optionally determines if the process requires an evaluation (e.g., an authentication) before the process can be executed. In at least some embodiments, the kernel driver 415 places a hold on the intercepted process while such an evaluation is performed.

The kernel driver 415 sends a request 445 for an evaluation of the intercepted process to an evaluation agent 420, such as the process authorization module 340 of FIG. 3. The evaluation agent 420 sends a request 450 to a multi-factor authentication (MFA) module 425, for example, for a multi-factor authentication of the process 410. The MFA module 425, for example, performs an authentication 455 of the process 410 and provides an MFA result 470 to the evaluation agent 420. The evaluation agent 420, in turn, provides a process approval or denial 475 to the kernel driver 415 based on the MFA result 470.

Upon receipt of an approval to execute the intercepted process 410, the kernel driver 415 will release the hold that was placed on the intercepted process 410 and provide the process 410 to be executed 480 to a process executor 435 for execution.

Figure 5:
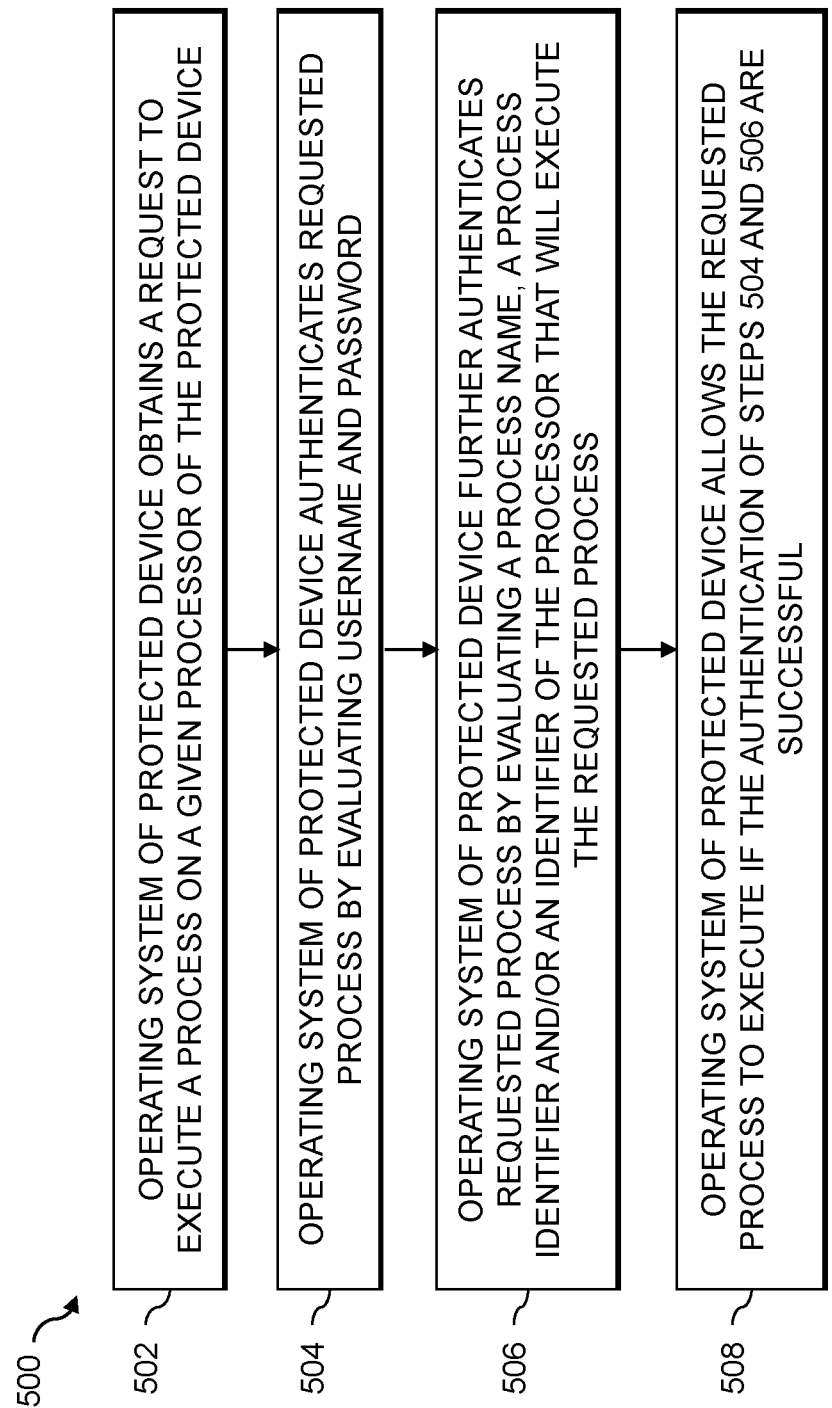
FIGS. 5 and 6 are flow charts illustrating exemplary implementations of processes for device protection using pre-execution multi-factor authentication of a process, according to one embodiment of the disclosure.

FIG. 5 is a flow chart illustrating an exemplary implementation of a process 500 for device protection using pre-execution multi-factor process authentication, according to one embodiment of the disclosure. In the example of FIG. 5, the operating system of the protected device obtains a request in step 502 to execute a process on a given processor (e.g., a motherboard) of the protected device. In step 504, the operating system of the protected device authenticates the requested process, for example, by evaluating username and password.

In step 506, the operating system of the protected device further authenticates the requested process, for example, by evaluating a process name, a process identifier and/or an identifier of the processor that will execute the requested process.

In step 508, the operating system of the protected device allows the requested process to execute if the authentication of steps 504 and 506 are successful.

Figure 6:
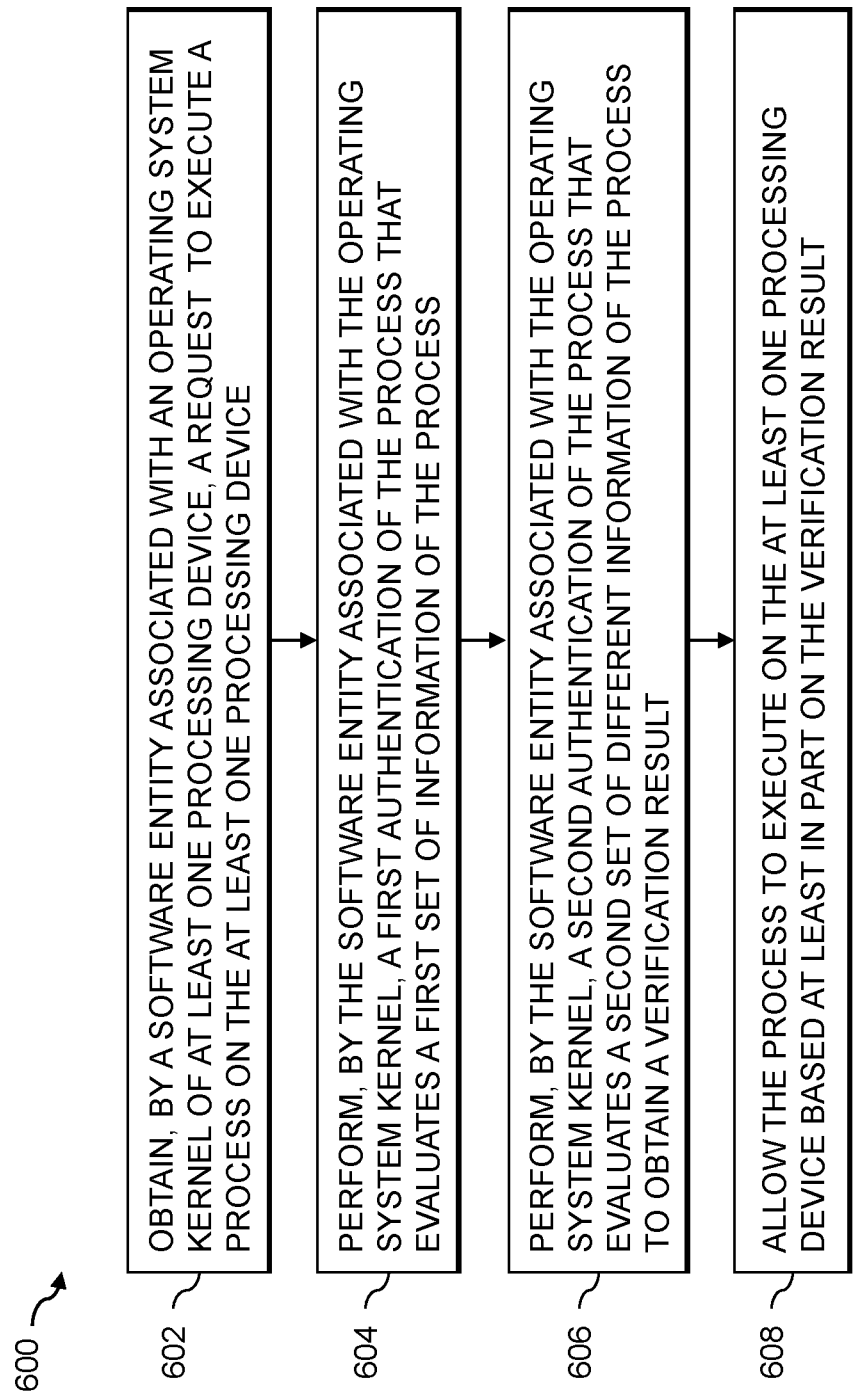

FIG. 6 is a flow chart illustrating an exemplary implementation of a process 600 for device protection using pre-execution multi-factor process authentication, according to one embodiment of the disclosure. In the example of FIG. 6, the process 600 obtains, by a software entity associated with an operating system kernel of at least one processing device, a request (e.g., an attempt) in step 602 to execute a process on the at least one processing device. In step 604, the software entity associated with the operating system kernel performs a first authentication of the process that evaluates a first set of information of the process (such as the username and password).

The software entity associated with the operating system kernel then performs a second authentication of the process in step 606 to obtain a verification result. The second authentication of the process evaluates a second set of different information (e.g., comprising process metadata) of the process. In step 608, the process is allowed to execute on the at least one processing device based at least in part on the verification result.

In some embodiments, the second set of different information of the process comprises one or more of: a name of the process, an identifier of the process and an identifier of a given one of the at least one processing device that will execute the process. The second authentication of the process may comprise comparing the process name of the process to a designated list of process names for a given entity. The second authentication of the process may comprise comparing the identifier of the given one of the at least one processing device to a designated list of processing devices for a given entity. For example, the process may execute on a motherboard and the identifier of the motherboard may comprise a serial number. The second authentication of the process may comprise comparing the identifier of the process to a designated list of process identifiers for a given entity. The identifier of the process may be assigned to the process in connection with an installation of the process on the at least one processing device. The identifier of the process may uniquely identify the process and the identifier of the process may be unique to a particular version of a process, for example. The designated lists may be created, for example, as part of an installation of a given device, or a class of devices. Metadata associated with the process may be stored in a trusted platform module of the at least one processing device.

In one or more embodiments, the second authentication of the process is performed by a multi-factor authentication module associated with the at least one processing device. The multi-factor authentication chip may be part of the at least one processing device or accessed on another device, such as a remote server. The first set of information of the process may comprise a username and a password of the process.

The particular processing operations and other network functionality described in conjunction with FIGS. 3 through 6, for example, are presented by way of illustrative example only, and should not be construed as limiting the scope of the disclosure in any way. Alternative embodiments can use other types of processing operations for device protection using pre-execution multi-factor process authentication. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for device protection using pre-execution multi-factor process authentication can be employed, for example, to monitor for unauthorized process execution and to mitigate a detected unauthorized request for process execution by automatically performing one or more actions to prevent an execution of the unauthorized process and/or to mitigate an impact of any unauthorized process execution.

One or more embodiments of the disclosure provide improved methods, apparatus and computer program products for device protection using pre-execution multi-factor process authentication. The foregoing applications and associated embodiments should be considered as illustrative only, and numerous other embodiments can be configured using the techniques disclosed herein, in a wide variety of different applications.

It should also be understood that the disclosed pre-execution process interception and authentication techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for device protection using pre-execution multi-factor process authentication may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based process interception and authentication engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based process interception and authentication platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
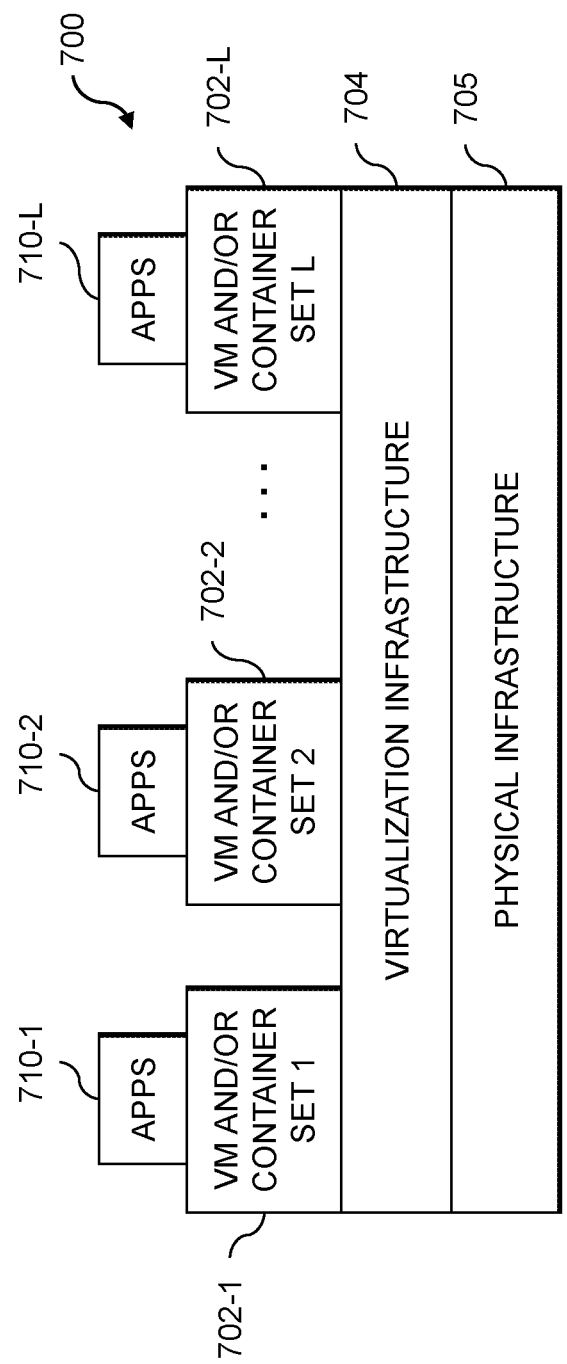
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide unauthorized process detection functionality of the type described above for one or more processes running on a given one of the VMs. For example, each of the VMs can implement unauthorized process detection control logic and associated mitigation functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide unauthorized process detection and mitigation functionality of the type described above for one or more processes running on different ones of the containers. For example, a container host device supporting multiple containers of one or more container sets can implement one or more instances of unauthorized process detection control logic and associated mitigation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
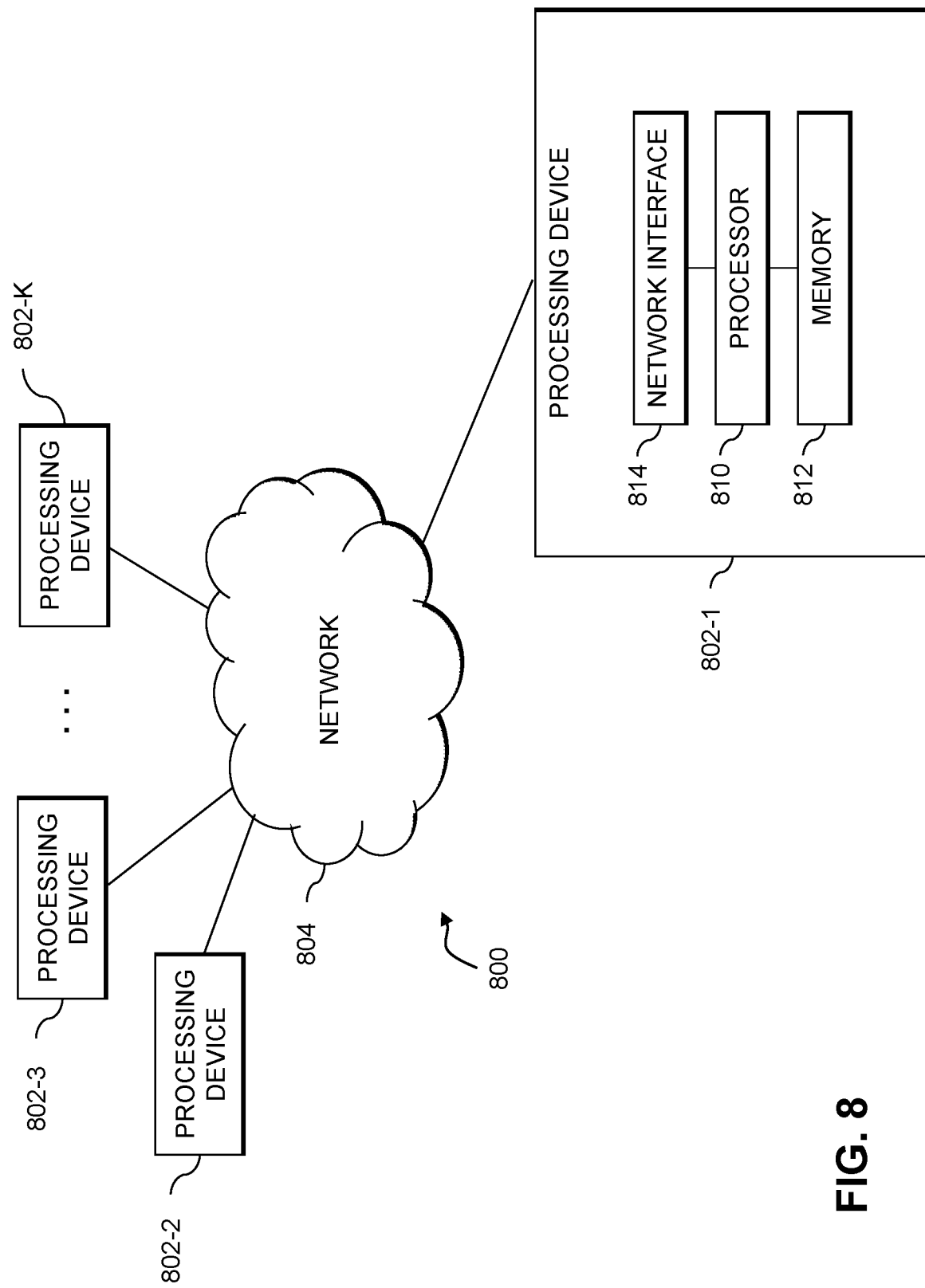
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining, by at least one software entity associated with an operating system kernel of at least one processing device, a request from a user to execute a process on the at least one processing device, wherein the process is distinct from the user;
    in response to the obtained request:
    performing, by the at least one software entity associated with the operating system kernel, a first authentication of the process that evaluates a first set of information of the process;
    performing, by the at least one software entity associated with the operating system kernel, a second authentication of the process to obtain a verification result, wherein the second authentication of the process evaluates a second set of different information of the process, wherein the second set of different information of the process comprises one or more of: a name of the process, an identifier of the process and an identifier of a given one of the at least one processing device that will execute the process; and
    allowing the process to execute on the at least one processing device based at least in part on the verification result;
    wherein the method is performed by the at least one processing device, wherein the at least one processing device comprises a processor coupled to a memory.

2. The method of claim 1, wherein the second authentication of the process comprises comparing the process name of the process to a designated list of process names for a given entity.

3. The method of claim 1, wherein the second authentication of the process comprises comparing the identifier of the given one of the at least one processing device to a designated list of processing devices for a given entity.

4. The method of claim 1, wherein the second authentication of the process comprises comparing the identifier of the process to a designated list of process identifiers for a given entity.

5. The method of claim 4, wherein the identifier of the process is stored in a trusted platform module of the at least one processing device.

6. The method of claim 1, wherein the second authentication of the process is performed by a multi-factor authentication module associated with the at least one processing device.

7. The method of claim 1, wherein the first set of information of the process comprises a username and a password of the process.

8. The method of claim 1, wherein the at least one software entity intercepts the request to execute the process and releases the process for execution based at least in part on the verification result.

9. The method of claim 1, wherein the second set of different information of the process comprises the identifier of a given one of the at least one processing device that will execute the process and at least one of the name of the process and the identifier of the process.

10. An apparatus comprising:
    at least one processing device comprising a processor coupled to a memory;
    the at least one processing device being configured to implement the following steps:
    obtaining, by at least one software entity associated with an operating system kernel of the at least one processing device, a request from a user to execute a process on the at least one processing device, wherein the process is distinct from the user;
    in response to the obtained request:
    performing, by the at least one software entity associated with the operating system kernel, a first authentication of the process that evaluates a first set of information of the process;

performing, by the at least one software entity associated with the operating system kernel, a second authentication of the process to obtain a verification result, wherein the second authentication of the process evaluates a second set of different information of the process, wherein the second set of different information of the process comprises one or more of: a name of the process, an identifier of the process and an identifier of a given one of the at least one processing device that will execute the process; and allowing the process to execute on the at least one processing device based at least in part on the verification result.

11. The apparatus of claim 10, wherein the second authentication of the process comprises one or more of: (i) comparing the process name of the process to a designated list of process names for a given entity; (ii) comparing the identifier of the given one of the at least one processing device to a designated list of processing devices for a given entity; and (iii) comparing the identifier of the process to a designated list of process identifiers for a given entity.

12. The apparatus of claim 10, wherein the second authentication of the process is performed by a multi-factor authentication module associated with the at least one processing device.

13. The apparatus of claim 10, wherein the first set of information of the process comprises a username and a password of the process.

14. The apparatus of claim 10, wherein the at least one software entity intercepts the request to execute the process and releases the process for execution based at least in part on the verification result.

15. The apparatus of claim 10, wherein the second set of different information of the process comprises the identifier of a given one of the at least one processing device that will execute the process and at least one of the name of the process and the identifier of the process.

16. A non-transitory processor-readable storage medium having stored therein program code of one or more software programs, wherein the program code when executed by at least one processing device causes the at least one processing device to perform the following steps:

obtaining, by at least one software entity associated with an operating system kernel of the at least one processing device, a request from a user to execute a process on the at least one processing device, wherein the process is distinct from the user;

in response to the obtained request:

performing, by the at least one software entity associated with the operating system kernel, a first authentication of the process that evaluates a first set of information of the process;

performing, by the at least one software entity associated with the operating system kernel, a second authentication of the process to obtain a verification result, wherein the second authentication of the process evaluates a second set of different information of the process, wherein the second set of different information of the process comprises one or more of: a name of the process, an identifier of the process and an identifier of a given one of the at least one processing device that will execute the process; and allowing the process to execute on the at least one processing device based at least in part on the verification result.

17. The non-transitory processor-readable storage medium of claim 16, wherein the second authentication of the process comprises one or more of: (i) comparing the process name of the process to a designated list of process names for a given entity; (ii) comparing the identifier of the given one of the at least one processing device to a designated list of processing devices for a given entity; and (iii) comparing the identifier of the process to a designated list of process identifiers for a given entity.

18. The non-transitory processor-readable storage medium of claim 16, wherein the second authentication of the process is performed by a multi-factor authentication module associated with the at least one processing device.

19. The non-transitory processor-readable storage medium of claim 16, wherein the at least one software entity intercepts the request to execute the process and releases the process for execution based at least in part on the verification result.

20. The non-transitory processor-readable storage medium of claim 16, wherein the second set of different information of the process comprises the identifier of a given one of the at least one processing device that will execute the process and at least one of the name of the process and the identifier of the process.

* * * * *